US012065354B2

(12) United States Patent
Cross

(10) Patent No.: US 12,065,354 B2
(45) Date of Patent: Aug. 20, 2024

(54) HORSE BIT

(71) Applicant: Neue Schule Limited, Bishop Auckland (GB)

(72) Inventor: Graham Hugh Cross, Stockton-on-Tees (GB)

(73) Assignee: NEUE SCHULE LIMITED, Bishop Auckland (GB)

( * ) Notice: Subject to any disclaimer, the term of this patent is extended or adjusted under 35 U.S.C. 154(b) by 0 days.

(21) Appl. No.: 17/946,786

(22) Filed: Sep. 16, 2022

(65) Prior Publication Data

US 2023/0070644 A1 Mar. 9, 2023

Related U.S. Application Data

(63) Continuation of application No. 15/738,072, filed as application No. PCT/EP2016/064608 on Jun. 23, 2016, now abandoned.

(30) Foreign Application Priority Data

Jun. 30, 2015 (EP) .................................... 15174689

(51) Int. Cl.
*B68B 1/06* (2006.01)

(52) U.S. Cl.
CPC ..................................... *B68B 1/06* (2013.01)

(58) Field of Classification Search
CPC ................................... B68B 1/04; B68B 1/06
(Continued)

(56) References Cited

U.S. PATENT DOCUMENTS 279,171 A 6/1883 Longcor
295,028 A 3/1884 Longcor
(Continued)

FOREIGN PATENT DOCUMENTS

DE 3225532 A1 1/1984
WO 00/23375 A1 4/2000

*Primary Examiner* — Peter M Poon
*Assistant Examiner* — Marisa V Conlon
(74) *Attorney, Agent, or Firm* — Andrew J. Anderson, Esq.; Harter Secrest & Emery LLP

(57) ABSTRACT

The invention relates to horse bit (10, 100), comprising a mouthpiece (20, 120) configured to be inserted into a horse's mouth and comprising a first cheek (40, 140) and a second cheek (60, 160). The mouthpiece includes a first end (21, 121) and a second end (22, 122) and a center portion (30, 130) between the first end and the second end, wherein the center portion comprises at least one curved portion (31, 32; 131, 132). Each cheek includes a shank (50, 70; 150, 170) with an upper arm (53, 73; 153, 173) and a lower arm (54, 74; 154, 174) for attachment of reins and a central portion (55, 75; 155, 175) between the upper arm and the lower arm. The central portion of the first cheek is attached to the first end and the central portion of the second cheek is attached to the second end. Each upper arm extends along a longitudinal axis (A1, A2) and the axes of the upper arms define a first plane and wherein the center portion extends in a second plane that is inclined at an angle ($\alpha$) of between 90° and 180° to the first plane, wherein the angle is measured forward from the upper arm. The invention relates to a horse bit assembly for inserting into a horse's mouth, comprising a first horse bit and a second horse bit wherein the first horse bit is a horse bit as mentioned above.

20 Claims, 12 Drawing Sheets

(58) Field of Classification Search
USPC .......................................................... 54/6.1–9
See application file for complete search history.

(56) References Cited

U.S. PATENT DOCUMENTS

| | | | | | |
|---|---|---|---|---|---|
| 511,811 | A | | 1/1894 | Smith et al. | |
| 794,681 | A | | 7/1905 | Phillips | |
| 801,436 | A | | 10/1905 | Atherton | |
| 831,102 | A | | 9/1906 | Riggs | |
| 1,076,442 | A | | 10/1913 | Niemann | |
| 1,078,987 | A | * | 11/1913 | Berry | B68B 1/06 54/7 |
| 2,193,451 | A | * | 3/1940 | Fryer | B68B 1/06 54/7 |
| 4,274,246 | A | * | 6/1981 | Stewart | B68B 1/06 54/6.1 |
| 4,587,797 | A | | 5/1986 | Conrad | |
| 4,884,390 | A | * | 12/1989 | Benjak | B68B 1/06 54/7 |
| 5,528,884 | A | | 6/1996 | Johnson | |
| 6,105,346 | A | * | 8/2000 | Hsi-Chang | B68B 1/06 54/8 |
| 6,347,501 | B1 | * | 2/2002 | Robart | B68B 1/06 54/8 |
| 6,761,018 | B2 | * | 7/2004 | Balding | B68B 1/06 54/7 |
| 2003/0009996 | A1 | | 1/2003 | Markle | |
| 2008/0250760 | A1 | | 10/2008 | Hyde-Saddington | |

* cited by examiner

HORSE BIT

The present invention relates to a horse bit, in particular to the mouthpiece of the horse bit. The horse bit can be designated as curb bit for a horse and the mouthpiece can also be designated as a shackle.

BACKGROUND AND PRIOR ART

A specific type of such a horse bit is a so-called curb bit which uses a lever action.

Such a common curb bit comprises a mouthpiece configured to be inserted into a horse's mouth and cheeks attached to the mouthpiece. The mouthpiece can be a straight bar or can have an arc shape. Each cheek includes a shank with an upper arm and a lower arm for attachment of reins.

A curb bit is intended to apply a strong command to the horse through a mechanism of rotation of the bit around its long axis induced by applying rein tension. The reins attach to the side parts of the curb which can be called the cheeks. The cheeks are connected to the mouthpiece of the curb. Usually, the cheeks comprise a solid shank with rings at the upper and lower extremities for the attachment of bridlework and/or reins.

The curb reins are attached to the cheeks at a level below that of the mouthpiece so that if one can describe the point at which the mouthpiece rests in the horse's mouth as a type of fulcrum then rein tension acting at some distance below the fulcrum generates a moment or torque centred on the mouthpiece longitudinal axis. The torque due to the rein tension produces some rotation of the cheeks about the mouthpiece longitudinal axis. The applied torque can become balanced by various opposing counter-torques so that further rotation is prevented.

In particular, the curb cheeks may have attached to them at some distance above the level of the mouthpiece a chain or flexible strap that passes under the horse's chin. This device is called the curb chain or curb strap. As the cheeks rotate the curb chain becomes tightened onto the chin of the horse which provides the counter-torque preventing further rotation. The resulting pressure on the chin of the horse acts as a strong command to the horse from the rider. The upper part of the curb cheek is often attached to a part of the bridle that passes over the top of the horse's head called the poll. The strap passing over the poll is called the head-piece. The rotation of the cheeks can then also be prevented by a counter-torque produced by a tightening of the head-piece onto the poll. The counter-torque can in principle generate pressure on the poll. This tightening may be a second method of conveying commands to the horse by applying rein tension.

Furthermore, if the cheeks are attached rigidly to the mouthpiece then the mouthpiece itself can rotate around its own mouthpiece longitudinal axis upon the rotation of the cheeks.

If the mouthpiece is so shaped that there is some extension of it out of the line of the longitudinal axis then the parts of the mouthpiece comprising the extension can in principle also exert some counter-torque by being brought into contact with internal parts of the horse's mouth.

In many riding situations the curb bit is used in conjunction with another bit called the bridoon. The bridoon is attached to a further set of reins that are separate from the reins used for the curb.

The bridoon is a type of bit whose mouthpiece may be jointed comprising either single, double or multiple joints. The bridoon is placed in the horse's mouth first when fitting the curb and bridoon together and it therefore adopts the position closest to the corners of the horse's mouth. The curb is then fitted and is positioned some short distance from the bridoon and further from the corners of the mouth.

When the bridoon rein tension is increased the bridoon moves further back in the mouth and compresses the tissues of the corners of the mouth. When the curb rein tension is increased the curb moves back towards the bridoon. A rotation of the mouthpiece around the mouthpiece longitudinal axis also occurs. The intention is that the bridoon is used continuously for the general control of the horse and the curb is intermittently used to exert a stronger additional control as required. The action of the two bits should be independent of each other.

Furthermore, it was found out that often the curb mouthpiece can become trapped between the bridoon mouthpiece and the tongue.

When rotated into its working position during riding the mouthpiece of the types of curb known in the prior art can be moved too close to that of the bridoon. This problem is exacerbated if the caudal angle between the axis of extension or radius of curvature and the tongue line is less than 90 degrees.

Most curb bits available in the prior art have the axis of extension or curvature of the mouthpiece lying in a line parallel to that of the line of the shanks of the cheeks of the curb. The axis or radius points upwards along the shank in these cases. It can be readily proved that the working position of the curb bit at full rotation brings this axis to a caudal angle of between 45 degrees and 55 degrees with respect to the tongue line.

This points the curb mouthpiece axis of extension or radius of curvature towards the resting position of the bridoon mouthpiece thus encouraging the trapping of the former underneath the latter.

This situation is highly undesirable. First, the occurrence of the stacking of one mouthpiece on top of the other one has the effect of increasing the space occupied by the bits between the upper and lower jaws in the mouth of the horse. It is known that in the closed mouth of the horse the average distance between the bony structures of the upper and lower jaws at the interdental space of each is on the order of 3.5 cm. The tongue usually fully occupies this space and must be compressed by the bit if the mouth is to be closed. It is typical for the combined thickness of mouthpieces of the curb and bridoon to be over 3 cm so that the tongue would become uncomfortably compressed if the mouth were to be forced closed. Second, the effectiveness of the bridoon in conveying variable rein forces to the contact points of the mouth will be severely disrupted and effectively eliminated. The effectiveness of the rein aids will be severely compromised.

The problem of the curb becoming trapped under the bridoon arises because the curb mouthpieces in the prior art have not taken account of the necessarily close juxtaposition of the two mouthpieces during riding.

DE 32 25 532 A1 discloses a horse bit having a mouthpiece with a center portion inclined at a forward angle of 45° to the upper shank arm. This results in a large pressure on the tongue and on the palate as the angle between the tongue plane or palate plane and the extension of the mouthpiece center portion is about 90°.

It is an object of the invention to provide a horse bit with an improved distribution of the pressure on the tongue. At the same time the bit should still be comfortable within the horse's mouth and fit to the anatomy of the horse's mouth in a good manner and find good acceptance with the horse. It is a further object of the present invention to solve the problem of trapping of a first horse bit and a second horse bit of a horse bit assembly placed in a horse's mouth.

SUMMARY OF THE INVENTION

The above object is achieved by a horse bit according to claim 1. According to the present invention, the horse bit comprises a mouthpiece configured to be inserted into a horse's mouth and comprising a first and a second cheek. The mouthpiece includes a first end and a second end and a center portion between the first and second end. The center portion comprises at least one curved portion. Further, each cheek includes a shank with an upper arm and a lower arm for attachment of reins and a central portion between the upper arm and the lower arm. The central portion of the first cheek is attached to the first end and the central portion of the second cheek is attached to the second end. Further, each upper arm extends along a longitudinal axis and the axes of the upper arms define a first plane and wherein the center portion extends in a second plane that is inclined at an angle of between 90° and 180° to the first plane, wherein the angle is measured forward from the upper arm.

The horse bit according to the invention can also be designated as a curb bit.

As to the understanding of the present invention or in a preferred embodiment it can be understood that the second plane intersects the first plane at the defined angle. Or in other words the upper shank arms define a plane and a radius of curvature of the center portion or an extension of the center portion lies or extends at the defined angle to the plane in a forward direction. Preferably, the longitudinal axis of extension of the center portion or the curved portion extends at the defined angle to the first plane.

Preferably, each upper arm includes an upper end and each lower arm includes a lower end. The upper arm can be designated as the upper shank arm and the lower arm can be designated as the lower shank arm. The axes of the upper arms can be designated as upwards lines starting at the central portion of the respective shank.

In other words, the first plane is defined by the upper arms (or upper shank arms) or by the longitudinal upper arm axes of the shanks and the center portion extends in a second plane that is inclined at an angle of between 90° and 180° to this first plane defined by the upper arms.

The angle is measured between the plane defined by the upper shank arm axes and the plane of extension of the center portion. Preferably, this angle is measured starting from the upper end of the upper shank arm.

For the purposes of definition it is further preferably to define negative angles between the second plane and the upwards direction of the shanks and positive angles between the second plane and the downwards direction of the shanks. The negative angles produce smaller caudal angles and may be called backward angles. The positive angles may be called forward angles.

Preferably, the second plane lies at a forward angle of between 115 degrees and 135 degrees to the upwards line of the shanks.

An advantage of the invention is that there can be a forward angle that results in a rostral angle that is zero degrees. In other words, the second plane lies parallel to the tongue line or the plane of the horse's tongue.

As a further advantage, the (curved) center portion can be described as lying flat on the tongue. This spreads the force from the reins over a larger surface area and reduces pressure on the tongue at the outer edges which is a problem with bits of the prior art. Thus, the force bearing area is enlarged and the pressure by the rein tension forces is more evenly distributed over the horse's tongue thus lowering the pressure on the tongue.

Furthermore, as to the terms used in the present invention, the mouthpiece generally extends in a length direction along a longitudinal axis or path, e.g. of the mouthpiece bar, of the mouthpiece side portions and/or of the central portion. The overall longitudinal path preferably can extend as a straight and/or curved line. Preferably, the longitudinal axis can extend within the mouthpiece and/or along the axis of the centre of gravity. Preferably, the longitudinal axis can be designated as longitudinal path. Preferably, the mouthpiece has an upper side related to the roof of the horse's mouth, a lower side related to the lower jaw of the horse's mouth and a forward side related to the opening of the horse's mouth. In view of these definitions the forward angle can be related to the forward side of the mouthpiece.

Preferably, the longitudinal axis of the mouthpiece extends substantially or exactly perpendicular to the shank axes. In other words, preferably, the longitudinal axis of the mouthpiece extends or lies within the first plane.

The mouthpiece of the horse bit according to the invention may have different configurations. In this connection, the mouthpiece preferably is a single bar, preferably without any joint. Alternatively, the mouthpiece may comprise one or more joints. In horse bits having at least one joint, the mouthpiece comprises at least two side portions, wherein the side portions are connected by the at least one joint such that the side portions are pivotable to each other.

As to the meaning of the directions in the present invention, the terms top, bottom, upper, lower, front and rear refer to the position of the bit in a horse's mouth when the horse holds his head in a normal position. Thus, "top" or "upper" means the region near the horse's ears, "bottom" or "lower" means the region near the horse's mouth opening, "front" refers to the region of the horse's nasal bone and "rear" refers to the region of the horse's lower jaw.

Preferred embodiments of the horse bit of the present invention are defined in claims 2 to 11 and will be further explained below.

Preferably, the at least one curved portion extends in the second plane that is inclined at an angle of between 90° and 180° to the first plane.

According to a preferred embodiment, the angle is in a range of about between 100° and 170°, preferably in a range of between 1200 and 140 and more preferably in a range of between 1150 and 135°.

In a preferred embodiment, an extension axis of the first end and/or the second end lies within the first plane. Preferably, the extension axis of the first end and/or the second end extends along the longitudinal mouthpiece axis or extends parallel to the first plane.

According to a preferred embodiment, the center portion has two curved portions. Preferably, the curvature extends across the full length of the mouthpiece starting and ending where the mouthpiece joins the cheeks or shanks. For ease of manufacture it can also be preferable to have the curvature starting and ending between two short sections of the mouthpiece that exhibit no curvature. The short sections of no curvature join with the cheeks and make alignment of the mouthpiece during manufacturing less problematic. In a further preferred embodiment, wherein the first end and second end can be curved.

According to a preferred embodiment, the center portion has a linear portion extending substantially parallel to the longitudinal mouthpiece axis, wherein the linear portion preferably is arranged between two curved portions.

In a preferred embodiment, at the centre of the mouthpiece the maximum distance of the longitudinal axis of the center portion to the first plane is in a range of 10 to 50 mm, preferably in a range of 15 to 25 mm.

Preferably, this distance can also be described as distance of extension of the curvature x at the centre of the longitudinal mouthpiece axis and most preferably is about 20 mm.

According to a preferred embodiment, a contact surface of the mouthpiece comprises at least one surface region having a linear or concave surface section. Preferably, a contact surface of the central portion of the mouthpiece comprises the at least one surface region having a linear or concave surface section. This embodiment describes an improvement to the horse bit by providing a flat or (slightly) concave cross-sectional profile such that this surface profile section of the shackle surface makes contact with the mouth tissue. Hence, the surface area of the mouthpiece is increased by the linear or concave profile section and the rein force is spread over a larger surface area to further reduce the overall pressure and the compressed tongue and lip tissue may fill the concave space. Moreover, a linear or concave surface profile section provides for a conformal coupling between the bit surfaces and the mouth surfaces which will lead to a lessening of the tendency for the bit to slide up and down the tongue.

In a preferred embodiment, the center portion of the mouthpiece has a width being larger than the width of the first end and/or the second end of the mouthpiece.

Preferably, the upper end and/or the lower end of each shank comprises a ring for attachment of reins or bridlework. Further, the lower arm of each shank can comprise a ring for attachment of a lip strap or a chain.

Preferably, the shank is attached to the first and/or second end in a rigid or in a pivotable manner.

According to a further aspect of the present invention, a horse bit assembly for inserting into a horse's mouth, comprises a first horse bit and a second horse bit wherein the first horse bit is a horse bit according to any of claims 1 to 11.

The second horse bit of the horse bit assembly according to the invention includes a mouthpiece. Preferably, this mouthpiece may comprise exactly one joint (single jointed horse bit), may comprise exactly two joints (double jointed horse bit) or could have more than two joints (multiple jointed horse bit). In horse bits having at least one joint, the mouthpiece comprises at least two side portions, wherein the side portions are connected by the at least one joint such that the side portions are pivotable to each other. Moreover, the second horse bit preferably comprises at least two eyelet members each having an eyelet bore and wherein the eyelet members are interlocked via their eyelet bores to provide the at least one joint. In case of a single-jointed horse bit the shackle comprises one joint and two side portions, wherein the two side portions are connected by the joint and each side portion has an inner end with one eyelet member having the eyelet bore and wherein the two eyelet members are interlocked with play via their eyelet bores to provide the joint. In case of a double-jointed horse bit the mouthpiece comprises two side portions and a central portion between these two side portions and two joints for connecting the central portion to the side portions. Each side portion has an inner end with one eyelet member having one eyelet bore and the central portion has two end sections wherein each end section has one eyelet member with one eyelet bore. Furthermore, each eyelet member of one end section is interlocked with play with the adjacent eyelet member of one side portion to provide a joint. Basically it is possible to have more than two side portions and/or more than one central portion.

The design of the curvature can be suitably chosen so that the axis of its extension or radius of its curvature points almost directly away from the resting position of the bridoon mouthpiece. Preferably, the distance of extension of the curvature at the centre of the longitudinal mouthpiece axis is about 20 mm.

As the (curb) rein tension is increased the curb mouthpiece is drawn back towards the bridoon in the normal way but now the center portion of the curb mouthpiece is kept away from the bridoon mouthpiece position and cannot become trapped underneath it.

In a preferred embodiment of the horse bit assembly, the assembly is configured to be inserted into the horse's mouth such that the plane of extension of the center portion of the first horse bit's mouthpiece and the plane of extension of the center portion of the second horse bit's mouthpiece extend substantially parallel to each other or such that the planes intersect at an angle of about between 0° and 30°, preferably about between 0° and 10°.

Preferably, a center portion of the first horse bit's mouthpiece does not overlap with the center portion of the second horse bit's mouthpiece.

DETAILED DESCRIPTION OF PREFERRED EMBODIMENTS

In the following the invention will be explained, by way of preferred embodiments, in more detail with reference to the drawings, wherein FIG. 1 is a perspective view of a first horse bit according to the prior art;

Figure 1:
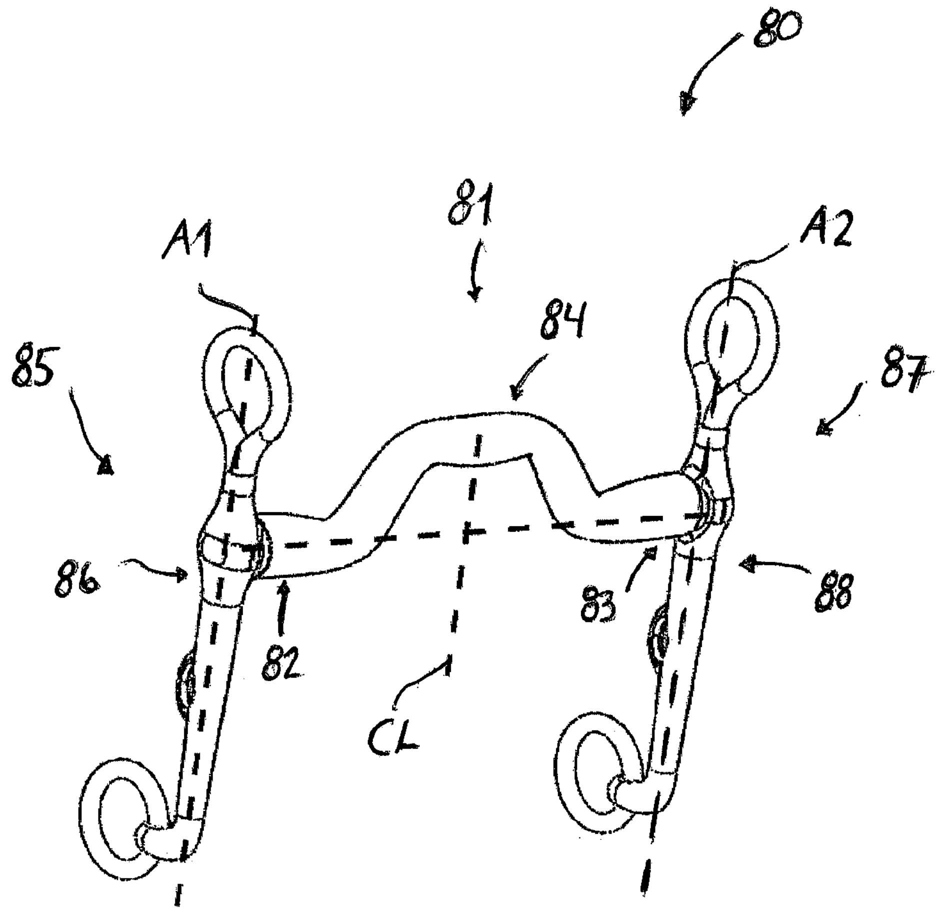
Figure 2:
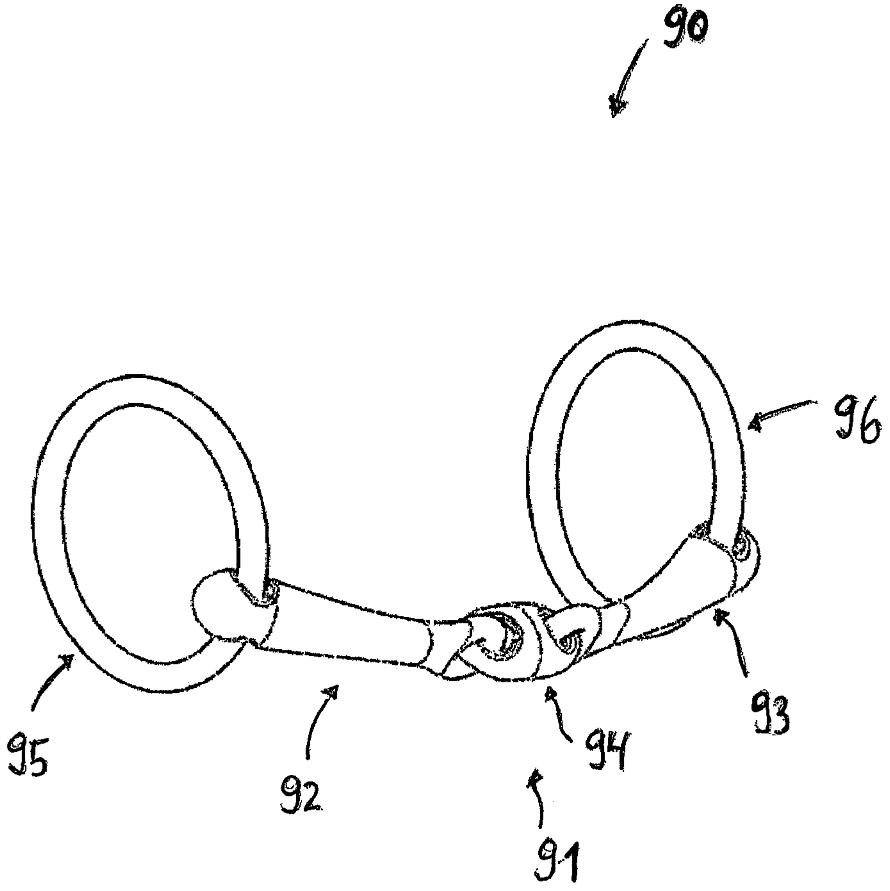
FIG. 2 is a perspective view of a second horse bit according to the prior art.
Figure 3:
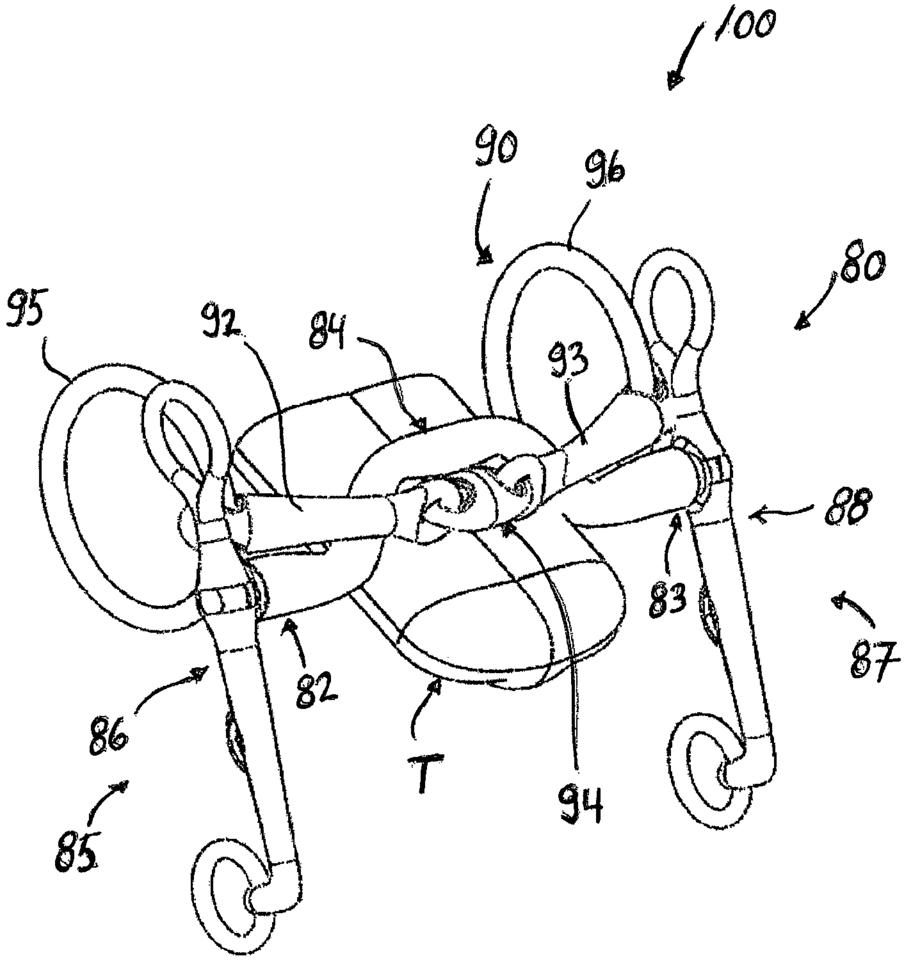
FIG. 3 is a perspective view of a horse bit assembly as a combination of the first horse bit shown in FIG. 1 and the second horse bit shown in FIG. 2 when positioned both in a horse's mouth over a horse's tongue.
Figure 4:
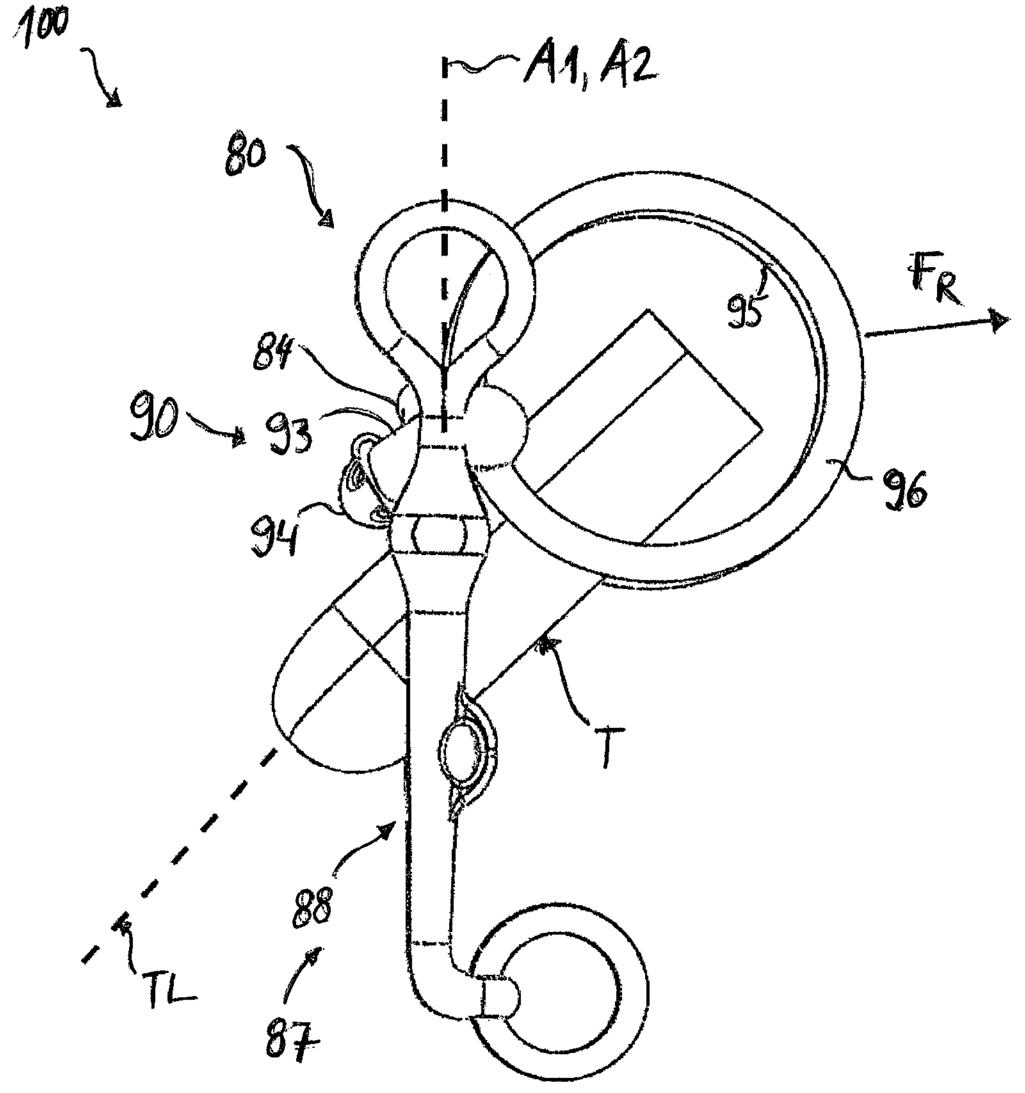
FIG. 4 is a side view of the horse bit assembly shown in FIG. 3.

FIG. 1 shows a first horse bit 80 according to the prior art. The first horse bit 80 can be designated as a curb bit. FIG. 2 shows a second horse bit 90 according to the prior art. The second horse bit 90 can be designated as a double-jointed bit or bridoon bit. FIGS. 3 and 4 show a horse bit assembly 100 as a combination of the first horse bit 80 shown in FIG. 1 and the second horse bit 90 shown in FIG. 2 when positioned both in a horse's mouth over a horse's tongue.

The first horse bit 80 comprises a mouthpiece 81, a first cheek 85 having a first shank 86 and a second cheek 87 having a second shank 88. The mouthpiece 81 includes a first end 82, a second end 83 and a center portion 84 between the first end 82 and the second end 83. The center portion 84 has an arched shape having two curved portions and a central substantially linear portion. The first cheek 85 is attached to the first end 82 and the second cheek is attached to the second end 83. The first shank 86 and the second shank 88 extend along a longitudinal shank axis A1, A2. These shank axes A1, A2 define a plane. The axis of extension of the arched shape lies within this plane. In other words, the plane of extension of the center portion 84 extends in the plane defined by the two shanks 86, 88. Further, FIG. 1 shows a center line CL which is parallel to shank axes A1, A2 and lies in the middle of the distance between the shank axes A1, A2. The configuration of the mouthpiece 81 is symmetrical to the center line CL.

According to FIG. 2, the mouthpiece 91 of the second horse bit 90 comprises two side portions 92, 93 and a center portion 94 between the two side portions 92, 93, wherein the two side portions 92, 93 are connected via the center portion 94 and two joints such that the side portions 92, 93 are pivotable to each other and/or to the center portion 94. The two joints connect the central portion 94 to the side portions 92, 93. Preferably, the two side portions 92, 93 are arm-shaped. Further, the side portion 92 comprises a first end and the side portion 93 comprises a second end. Each end comprise a bore. The bores are configured to receive the side rings 95, 96 for attachment of reins. The side rings 95, 96 extend through the bores such that the side rings 95, 96 are free to slide through the bores. Preferably, the axes of the bores extend perpendicular to the longitudinal axis of the mouthpiece 91.

FIGS. 3 and 4 show a horse bit assembly 100 comprising the first horse bit 80 shown in FIG. 1 and the second horse bit 90 shown in FIG. 2 when positioned both in a horse's mouth over a horse's tongue T. The extension of tongue can be designated by a tongue line TL. FIGS. 3 and 4 show a schematic representation of the tongue of the horse onto which the first horse bit (curb bit) of the prior art and the second horse bit (bridoon) of the prior art have been placed at the orientations they adopt when rein tension is applied in the direction shown by the arrow $F_R$. That means that the radius of the center portion 84 of the curb bit of the prior art profile lies at a large angle to the tongue line TL. As further can be taken from FIGS. 3 and 4, the first horse bit 80 lies underneath the second horse bit 90 with its art center portion 84 pointing generally in a caudal (or, rearwards) direction. In such a situation, the first horse bit 80 (curb) can become trapped between the second horse bit 90 (bridoon) and the tongue T.

Figure 5:
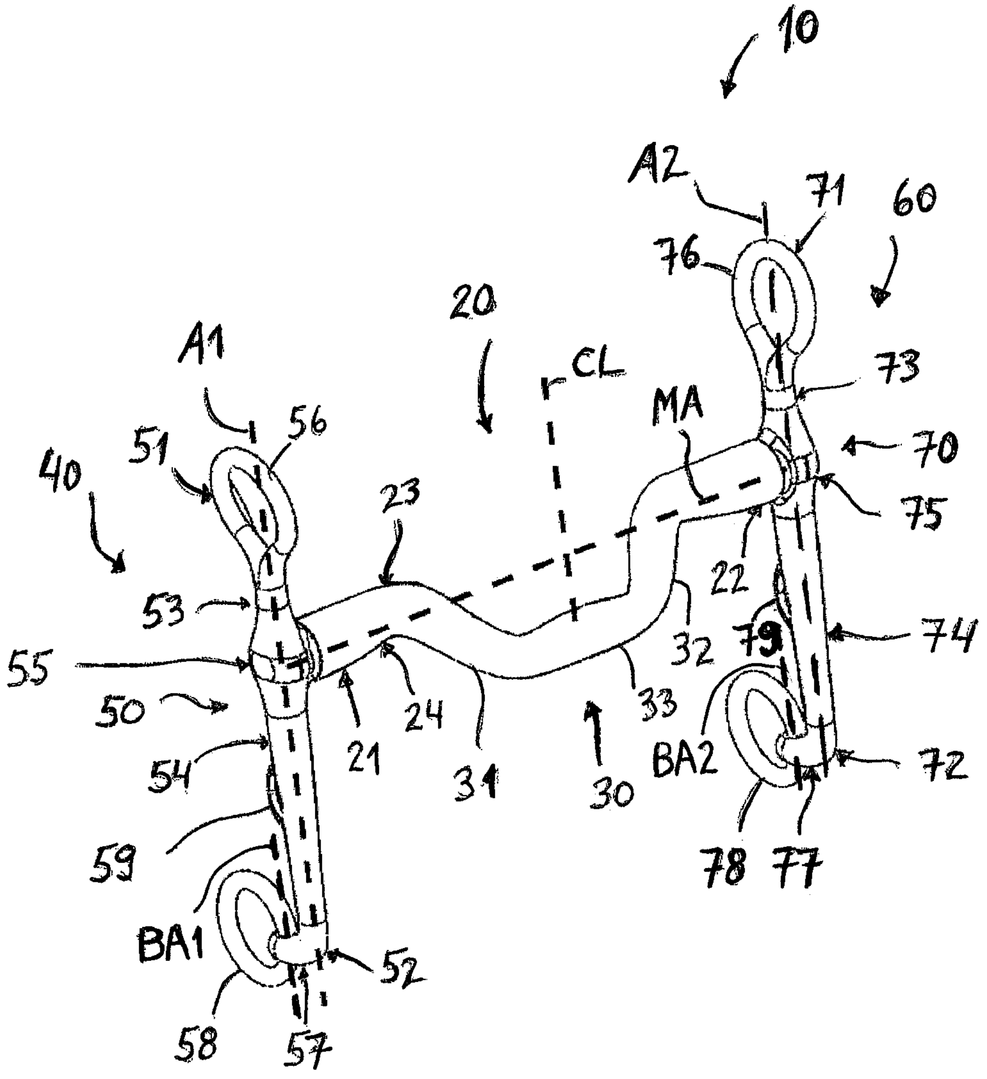
FIG. 5 is a perspective view of a horse bit according to a first embodiment of the present invention.

FIG. 5 shows a first embodiment of a horse bit 10 according to the present invention which also can be designated as a curb bit.

The horse bit 10 according to the first embodiment comprises a mouthpiece 20 configured to be inserted into a horse's mouth such that the mouthpiece 20 extends over the horse's tongue T and lies between the horse's tongue T and the horse's palate. An upper surface 23 of the mouthpiece 20 faces to the horse's palate and a lower surface 24 of the mouthpiece 20 faces to the horse's lower jaw. A front side of the mouthpiece faces forward and is related to the opening of the horse's mouth.

The mouthpiece 20 includes a first end 21 and a second end 22 and a center portion 30 between the first end 21 and the second end 22. In the first embodiment, the center portion 30 has an curved or arched shape and comprises at least one curved portion. Preferably, as shown in FIG. 5, the center portion 30 comprises two curved portions 31 and 32. Moreover, the center portion 30 comprises a substantially linear portion 33 at the center of the mouthpiece 20 and between the two curved portions 31, 32.

Generally, the mouthpiece 20 extends along a longitudinal mouthpiece axis MA. Preferably, the longitudinal path of the mouthpiece 20 is at least slightly curved and/or extends along the center line of the mouthpiece 20 (or its sections or parts). Preferably, the linear portion 33 extends substantially parallel to the longitudinal mouthpiece axis and the longitudinal axes of the curved portions 31, 32 are inclined at an angle of between 20° and 60° to the mouthpiece axis MA.

Moreover, the horse bit 10 comprises a first cheek 40 and a second cheek 60.

The first cheek 40 comprises a first shank 50 having an upper arm 53 for attachment of bridlework, a lower arm 54 for attachment of reins and a central portion 55 between the upper arm 53 and the lower arm 54. The central portion 55 is attached to the first end 21 of the mouthpiece 20 in a rigid or pivotable manner. The upper arm 53 extends along a first longitudinal axis A1, which can also be designated as a first shank axis. Upper arm 53, lower arm 54 and central portion 55 are formed as a unitary one-piece member. An upper end 51 of the upper arm 53 comprises a ring 56 for attachment of bridlework. It is preferred that the axis of ring 56 extends or aligns at an angle of less than 90° to axis A1 or the first plane, such that ring 56 turns away from the side of the horse's head to take the attached bridlework away from the face of the horse. Preferably, the axis of ring 56 extends at an angle of about 5° to 10°, in particular about 8°, to axis A1. A lower end 52 of the lower arm 54 comprises a bore 57 for receiving a ring 58 for attachment of reins such that the ring 58 is free to slide through bore 57. Preferably, the axis BA1 of the bore 57 extends substantially parallel to the first axis A1. Further, it is preferred that the axis of ring 58 extends substantially perpendicular to the first axis A1 and/or substantially parallel to the mouthpiece axis MA. The lower arm 54 comprises a further ring 59 which can also be designated as a lip strap ring or chain ring for connecting a strap or a chain.

Similar to the first cheek 40, the second cheek 60 comprises a second shank 70 having an upper arm 73 for attachment of bridlework and a lower arm 74 for attachment of reins and a central portion 75 between the upper arm 73 and the lower arm 74. The central portion 75 is attached to the second end 22 of the mouthpiece 20 in a rigid or pivotable manner. The upper arm 73 extends along a second longitudinal axis A2, which can also be designated as a second shank axis. Upper arm 73, lower arm 74 and central portion 75 are formed as a unitary one-piece member. An upper end 71 of the upper arm 73 comprises a ring 76 for attachment of bridlework. It is preferred that the axis of ring 76 extends or aligns at an angle of less than 90° to axis A2 or the first plane, such that ring 76 turns away from the side of the horse's head to take the attached bridlework away from the face of the horse. Preferably, the axis of ring 76 extends at an angle of about 5° to 10°, in particular about 8°, to axis A2. Thus, the planes of extension of the rings 56 and 76 intersect at the forward side of the mouthpiece 20 at an angle in the range of 10° to 20°, in particular at an angle of about 16°. A lower end 72 of the lower arm 74 comprises a bore 77 for receiving a ring 78 for attachment of reins such that the ring 78 is free to slide through bore 77. Preferably, the axis BA2 of the bore 77 extends substantially parallel to the second axis A2. Further, it is preferred that the axis of ring 78 extends substantially perpendicular to the second axis A2 and/or substantially parallel to the mouthpiece axis MA. The lower arm 74 comprises a further ring 79 which can also be designated as a lip strap ring or chain ring for connecting a strap or a chain.

In FIG. 5, according to the present invention, each upper arm 53, 73 extends along a longitudinal axis A1, A2 and the axes A1, A2 define a first plane, wherein the center portion 30 extends in a second plane that is inclined at an angle α of between 90° and 180° to the first plane and wherein the angle α is measured forward form the upper arm 53, 73. The axes A1, A2 of the upper arms 53, 73 can also be designated as upwards lines starting at the central portion 55, 75 of the respective shank 50, 70. Preferably, this angle is measured starting from the upper end 51, 71 of the upper shank arms 53, 73 and in a forward direction to the front side of the mouthpiece or to the opening of the horse's mouth.

Figure 7:
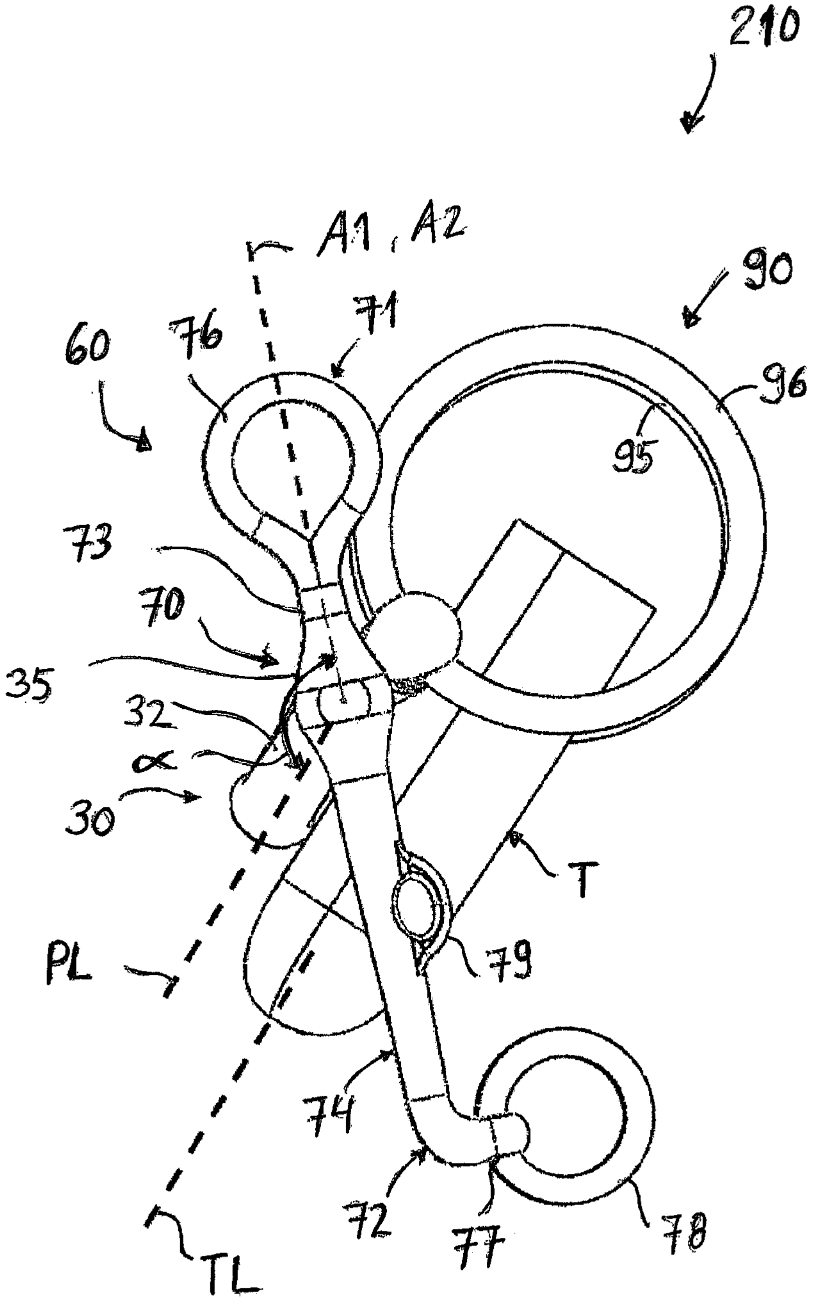
FIG. 7 is a side view of the horse bit assembly shown in FIG. 6

Thus, the first plane is defined by the first axis A1 and the second axis A2. In other words, the extension plane of the center portion 30 extends at this angle α to the first plane. Thus, the second plane intersects with the first plane at the defined angle. In the preferred first embodiment, as shown in particular in FIG. 7, the angle α preferably is a range of between 115° and 135°. In FIG. 7 a plane line PL is shown which lies within the second plane and thus, indicates the extension direction of the second plane and the center portion 30. Moreover, the extension of the second plane of the center portion 30 extends substantially parallel to the tongue line TL and thus to the tongue plane T.

As a result, the center portion 30 lies flat on the tongue T. This spreads the force from the reins over a larger surface area and reduces pressure on the tongue. Thus, the force bearing area is enlarged and the pressure by the rein tension forces is more evenly distributed over the horse's tongue thus lowering the pressure on the tongue. Furthermore the centre portion 30 does not point towards the palate and is therefore more comfortable for the horse.

The mouthpiece axis MA lies within the first plane and/or extends in a direction which is (substantially) perpendicular to the first axis A1 and the second axis A2. Preferably, the extension axis of the first end 21 and the extension axis of the second end 22 lies within the first plane or, in other words, extends substantially parallel to the mouthpiece longitudinal axis MA. Moreover, FIG. 5 shows a center line CL which is parallel to axes A1, A2 and lies in the middle of the distance between the axes A1, A2. Preferably, the configuration of the mouthpiece 20 is symmetrical to the center line CL.

Figure 6:
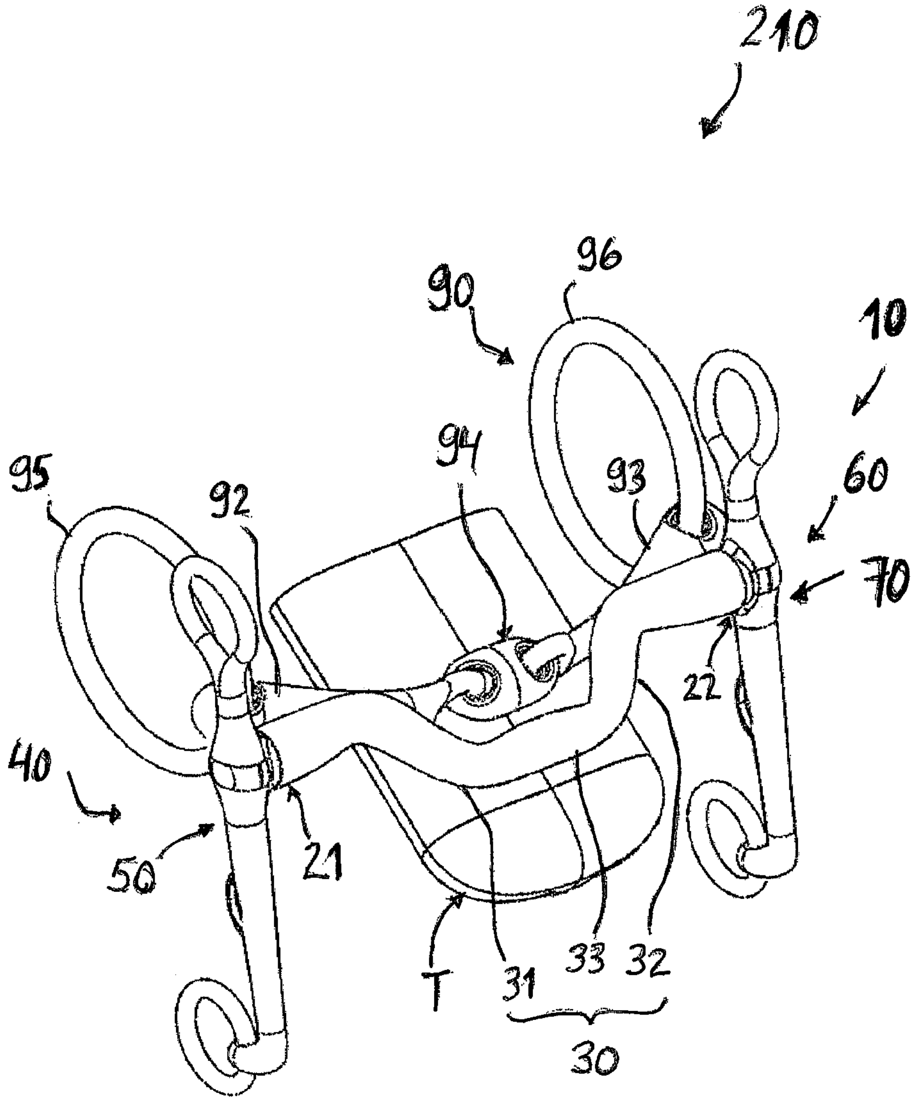
FIG. 6 is a perspective view of a horse bit assembly as a combination of the horse bit shown in FIG. 5 and the second horse bit shown in FIG. 2 when positioned both in a horse's mouth over a horse's tongue.

FIG. 6 shows a perspective view of the horse bit assembly 210 according to the invention comprising the first horse bit 10 as shown in FIG. 5 and the second horse bit 90 as shown in FIG. 2, when positioned both in a horse's mouth over a horse's tongue T. In other words, FIG. 6 shows a combination of a curb bit according to the invention and a bridoon bit as known from the prior art. As can be taken from FIG. 6, the center portion 30 of the horse bit 10 does not overlap with the center portion 94 of the horse bit 90. As can be taken from FIGS. 6 and 7 the plane of extension of the central portion 30 of the mouthpiece 20 of the first horse bit 10 and the plane of extension of the center portion 94 of the mouthpiece 91 of the second horse bit 90 extends substantially parallel to each other or extend such that the two planes intersect at an angle of between 0° and 30°, preferably in a range of between 0° and 10°. In other words, both mouthpieces 20, 91 substantially extend parallel to the tongue T or the tongue plane.

Figure 8:
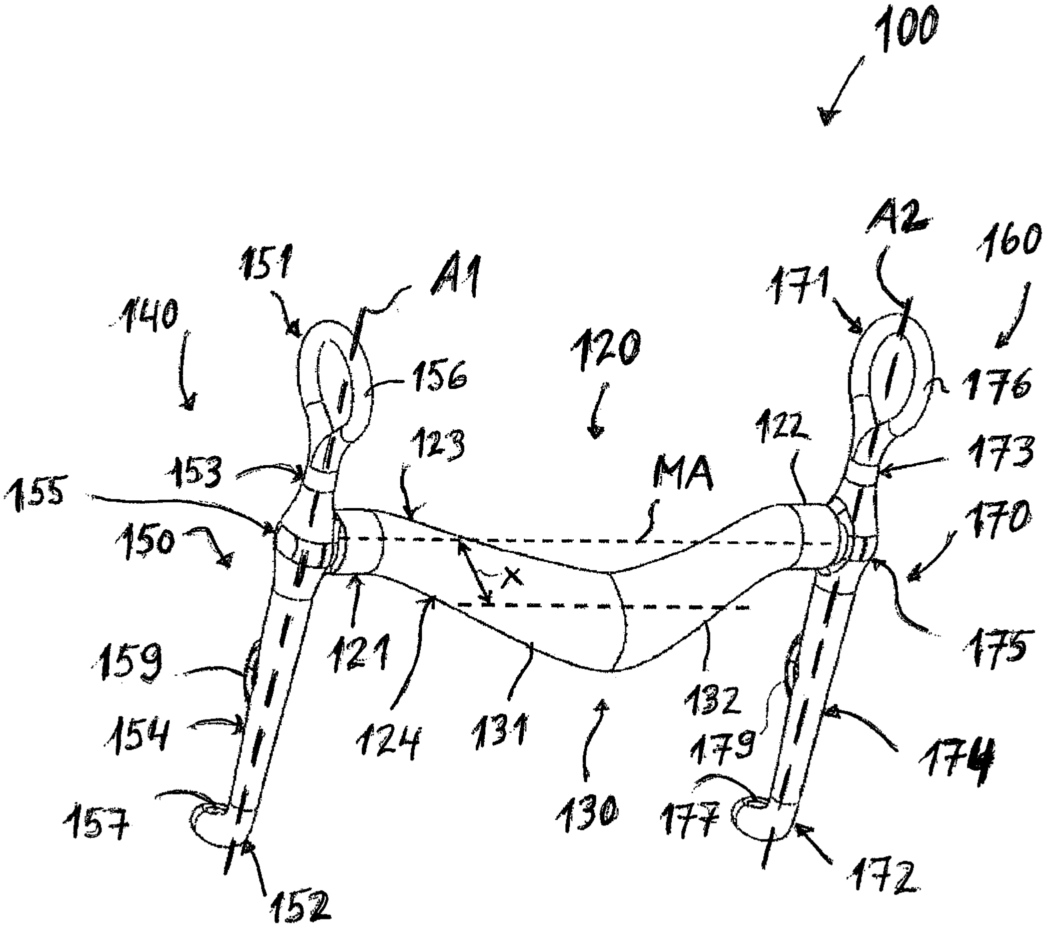
FIG. 8 is a perspective view of a horse bit according to a second embodiment of the present invention.
Figure 9:
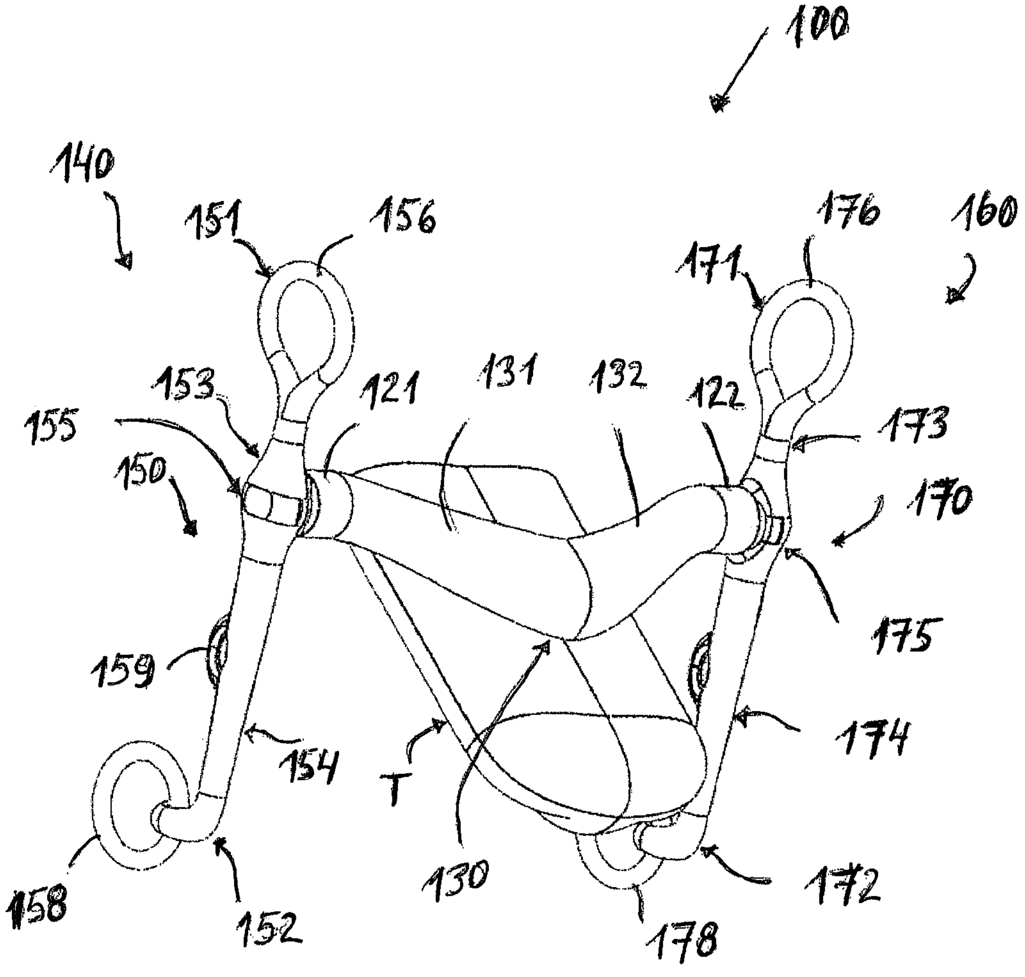
FIG. 9 is a perspective view of the horse bit shown in FIG. 8 when positioned in a horse's mouth over a horse's tongue.
Figure 10:
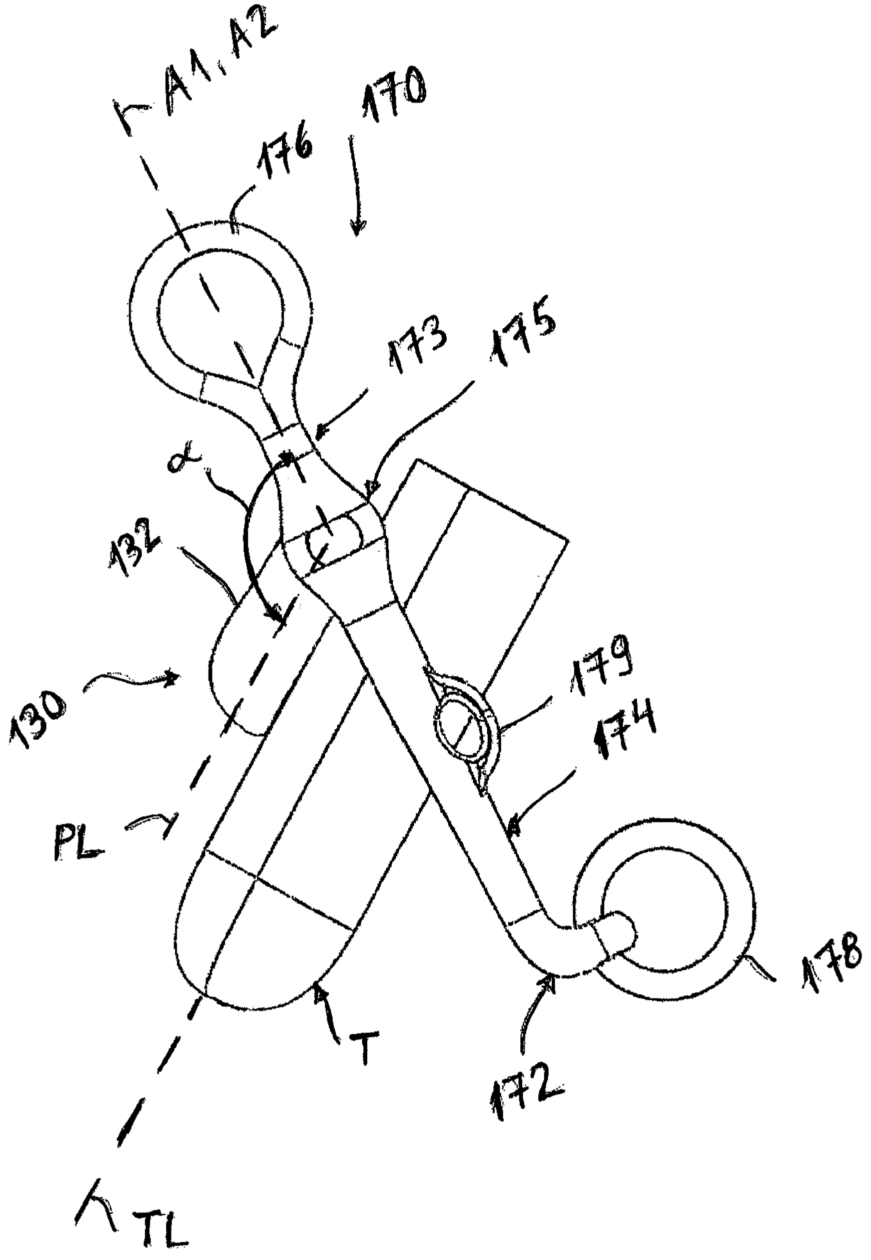
FIG. 10 is a side view of the horse bit shown in FIG. 9

In the following, a second embodiment of a horse bit 100 according to the invention as shown in FIG. 8 to 10 will be described.

Figure 11:
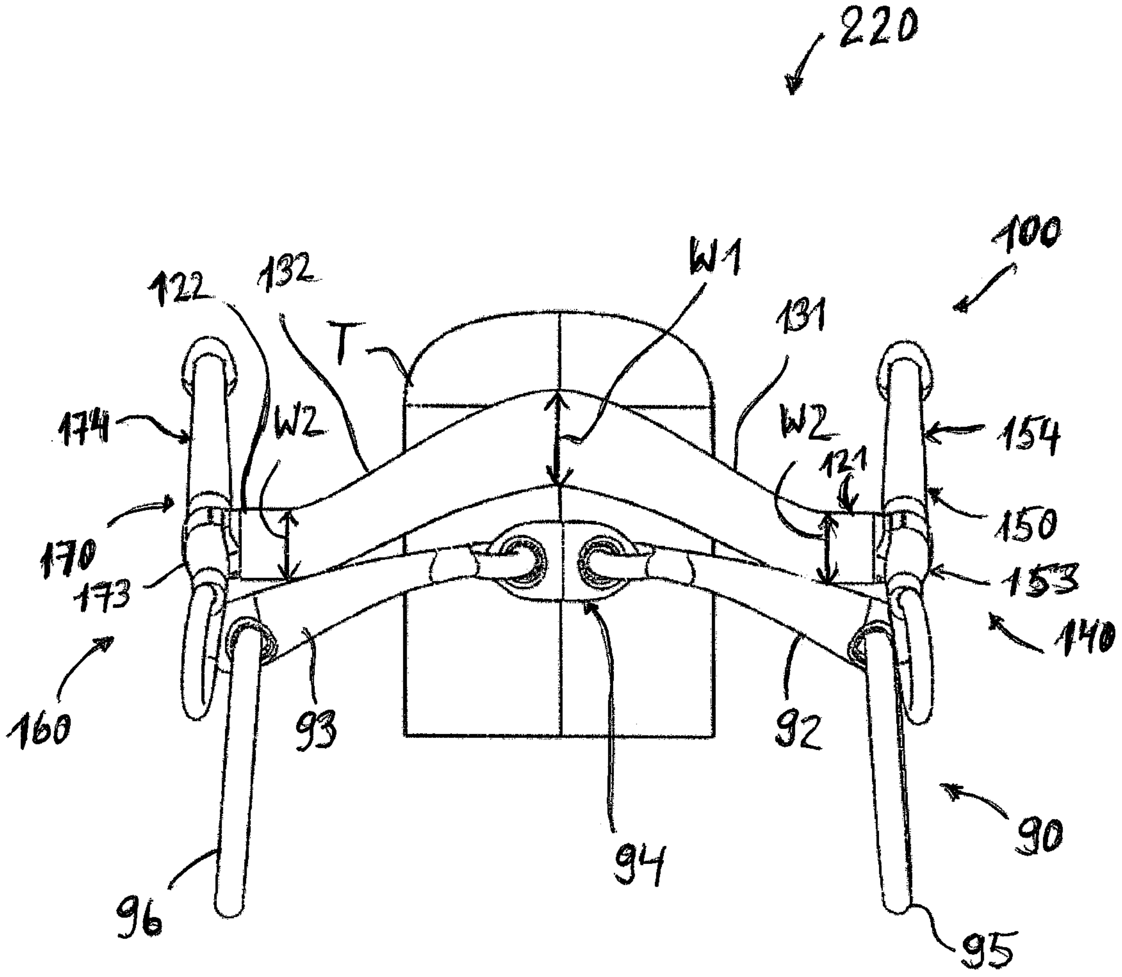
FIG. 11 is a perspective view from above of a horse bit assembly combining the horse bit shown in FIG. 8 and the second horse bit shown in FIG. 2 when positioned both in a horse's mouth over a horse's tongue.

FIG. 8 is a perspective view of a horse bit 100 according to the second embodiment similar to the perspective view of FIG. 5 referring to the first embodiment. FIG. 9 to 11 refer to the second embodiment too.

The horse bit 10 according to the first embodiment and the horse bit 100 according to the second embodiment distinguish from each other only in that a mouthpiece 120 of the horse bit 100 has a different shape than the mouthpiece 20, in particular relating to the central portion. In other words, the horse bit 100 comprises a first cheek having a first shank and a second cheek having a second shank with the identical features as mentioned in connection with the first embodiment. Therefore, identical parts of the second embodiment were designated by reference numbers added by 100; i.e. parts 40 to 79 of the first embodiment are designated with the numbers 140 to 179. As to the detailed description regarding 140 to 179 it is referred to above explanations regarding reference signs 40 to 79.

In the following, only the differences as to the mouthpiece 120 compared to the mouthpiece 20 are explained. The mouthpiece 120 comprises a first end 121, a second end 122 and a center portion 130. The mouthpiece has an upper surface 123 and a lower surface 124. A comparison between FIG. 5 and FIG. 8 shows that the first end 121 and the second end 122 are shorter sections compared to the first end 21 and the second end 22. The center portion 130 comprises a curved portion 131 and a curved portion 132, but does not have a linear portion in between. As shown in FIG. 8 the distance x between the longitudinal axis MA of the mouthpiece 120 and the center of the mouthpiece at the connection between the curved portion 131 and the curved portion 132 is in a range of between 10 mm to 50 mm, preferably in a range of 15 mm to 25 mm. In other words, the distance x between the longitudinal axis MA of the mouthpiece 120 and the center of the mouthpiece is measured at a center line of the mouthpiece 120 similar to the center line mentioned in connection with FIG. 5. As an advantage of the horse bit 100 the curvature in the mouthpiece 120 extends over a longer overall length.

FIG. 9 shows a perspective view of the horse bit 100 shown in FIG. 8 when positioned in a horse's mouth over a horse's tongue T and FIG. 10 shows a side view of the horse bit 100 as shown in FIG. 9. Again, the extension of the plane of the center portion 130 extends substantially parallel to the tongue plane T. In FIG. 10 a plane line PL is shown which lies within the second plane and thus indicates the extension direction of the second plane and the center portion 130. In other words, the extension plane of the center portion 130 extends at the angle α to the first plane. Thus, the second plane intersects with the first plane at the defined angle. Like in the first embodiment the angle α preferably is a range of between 115° and 135°. As a result, the same advantages can be achieved as mentioned in connection with the above first embodiment.

FIG. 11 is a perspective view from above of a horse bit assembly 220 combing the horse bit 100 shown in FIG. 8 to 10 and the second horse bit 90 shown in FIG. 2 when positioned both in a horse's mouth over a horse's tongue T. In this situation, as shown in FIG. 11, rein tension is applied and the horse bit 100 is placed onto the tongue. As can be taken from FIG. 11 in connection with FIG. 9 to 10, the center portion 130 of the horse bit 100 does not overlap with the center portion 94 of the horse bit 90. The plane of extension of the central portion 130 of the mouthpiece 120 of the first horse bit 100 and the plane of extension of the center portion 94 of the mouthpiece 91 of the second horse bit 90 extends substantially parallel to each other or extend such that the two planes intersect at an angle of between 0° and 30°, preferably in a range of between 0° and 10°. In other words, both mouthpieces 120, 91 substantially extend parallel to the tongue T. The overlap of the mouthpiece 120 with the mouthpiece 91 of the second horse bit 90 is smaller compared to the horse bit assembly of the prior art. As further shown in FIG. 11, the center portion 130 of the mouthpiece 100 has a width W1 being lager than the width W2 of the first end 121 and/or the second end 122 of the mouthpiece 120. Preferably, the width W1 and the width W2 are measured along the extension of the second plane. As an advantage the rein tension can be spread over a wider area on the tongue and, thus, the pressure on the tongue is reduced. Such a reduction in pressure will make the bit more comfortable for the horse.

Figure 12:
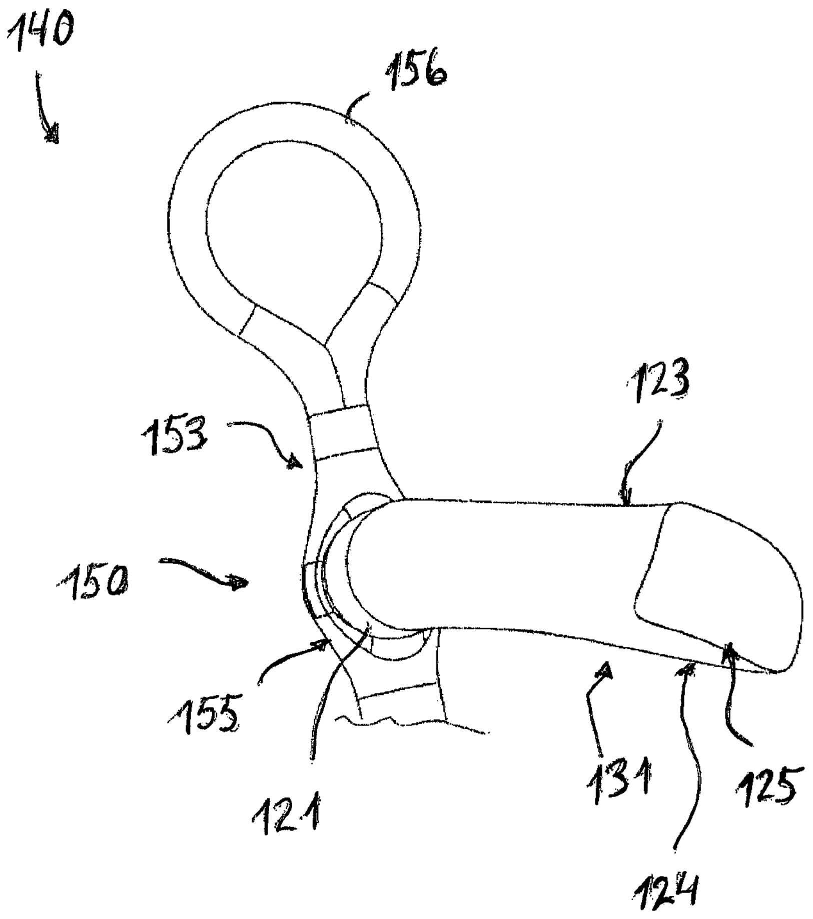
FIG. 12 is a perspective view of a cross-section of the horse bit shown in FIG. 8.

In a further embodiment of the invention, a contact surface of the mouthpiece 20, 120, preferably the lower surface 24, 124 comprises at least one surface region having a linear or concave surface section 125. In other words, the lower surface 124 presented substantially parallel to the plane of the tongue is flattened or slightly concave as shown in the perspective cross-section in FIG. 12.

LIST OF REFERENCE SIGNS

10 horse bit (curb)
20 mouthpiece
21 first end
22 second end
23 upper surface
24 lower surface
30 center portion
31 curved portion
32 curved portion
33 linear portion
40 first cheek
50 shank
51 upper end
52 lower end
53 upper arm
54 lower arm
55 central portion
56 ring
57 bore
58 ring
59 ring
87 second cheek
60 second cheek
70 shank
71 upper end
72 lower end
73 upper arm
74 lower arm
75 central portion
76 ring
77 bore
78 ring
79 ring
90 horse bit (bridoon)
91 mouthpiece
92 side portion
93 side portion
94 center portion
95 side ring
96 side ring
80 horse bit (curb)
81 mouthpiece
82 first end
83 second end
84 center portion
85 first cheek
86 first shank
88 second shank
100 horse bit (curb)
120 mouthpiece
121 first end
122 second end
123 upper surface
124 lower surface
125 surface section
130 center portion
131 curved portion
132 curved portion
140 first cheek
150 shank
151 upperend
152 lower end
153 upper arm
154 lower arm
155 central portion
156 ring
157 bore
158 ring
159 ring
160 second cheek
170 shank
171 upper end
172 lower end
173 upper arm
174 lower arm
175 central portion
176 ring
177 bore
178 ring
179 ring
200 horse bit assembly
210 horse bit assembly
220 horse bit assembly
MA mouthpiece axis
A1 first axis
A2 second axis
CL center line
PL plane line
T tongue
TL tongue line
$F_R$ rein tension
α angle
x distance
W1 width
W2 width

The invention claimed is:

1. A horse bit for a horse having a mouth including a mouth opening and ears, the mouth opening including a roof and a lower jaw, the horse bit comprising:

a mouthpiece configured to be inserted into the mouth of the horse and comprising a first cheek and a second cheek;

wherein the mouthpiece has an upper side toward the roof of the mouth opening of the horse and includes a first end and a second end and a center portion between the first end and the second end, wherein the first end and the second end extend along a longitudinal mouthpiece axis, and wherein the center portion comprises at least one curved portion and is the center portion of the mouthpiece;

wherein each cheek includes a shank with an upper arm terminating at an upper arm end and a lower arm terminating at a lower arm end and a central portion between the upper arm and the lower arm, the lower arm nearer the mouth opening than the upper arm and the upper arm nearer the ears than the lower arm, each lower arm end having a rein attachment ring, and each upper arm including a bridlework ring having a terminal portion longitudinally spaced from the central portion of the corresponding shank;

wherein the central portion of the first cheek is attached to the first end of the mouthpiece to locate a length of the upper arm of the first cheek intermediate the bridlework ring of the first cheek and the first end of the mouthpiece attached to the first cheek, and the central portion of the second cheek is attached to the second end of the mouthpiece to locate a length of the upper arm of the second cheek intermediate the bridlework ring of the second cheek and the second end of the mouthpiece attached to the second cheek;

wherein each upper arm extends along a longitudinal axis and the axes of the upper arms define a first plane and wherein the mouthpiece is further configured such that the center portion of the mouthpiece extends in a second plane that is inclined at an angle (α) of between 100° and 170° to the first plane, wherein the angle (α) is measured forward from the upper arm along the upper side of the mouthpiece;

wherein for each shank a distance from the central portion to the lower arm end is greater than a distance from the central portion to the upper arm end;

wherein the terminal portion of the bridlework rings are spaced by a distance greater than the distance between the longitudinal axes of the upper arms.

2. The horse bit according to claim 1, wherein the at least one curved portion extends in the second plane that is inclined at an angle (α) of between 100° and 170° to the first plane.

3. The horse bit according to claim 2, wherein the angle (α) is in a range between 120° and 140°.

4. The horse bit according to claim 2, wherein the angle (α) is in a range between 115° and 135°.

5. The horse bit according to claim 1, wherein an extension axis of the first end and/or the second end lies within the first plane.

6. The horse bit according to claim 5, wherein the center portion has a linear portion extending substantially parallel to the longitudinal mouthpiece axis, and wherein the linear portion is arranged between two curved portions.

7. The horse bit according to claim 1, wherein the center portion has two curved portions.

8. The horse bit according to claim 1, wherein the center portion has a linear portion extending substantially parallel to the longitudinal mouthpiece axis.

9. The horse bit according to claim 8, wherein the first end and second end are curved.

10. The horse bit according to claim 1, wherein the first end and second end are curved.

11. The horse bit according to claim 1, wherein at the center of the mouthpiece the maximum distance of the longitudinal axis of the center portion to the first plane is in a range of 10 to 50 mm.

12. The horse bit according to claim 11, wherein the maximum distance of the longitudinal axis of the center portion to the first plane is in a range of 15 to 25 mm.

13. The horse bit according to claim 1, wherein the mouthpiece has a lower surface toward the lower jaw of the horse, and the lower surface of the mouthpiece comprises at least one surface region having a flattened linear or slightly concave surface section which is substantially parallel to the plane of the tongue of the horse.

14. The horse bit according to claim 1, wherein the center portion of the mouthpiece has a width being larger than the width of the first end and/or the second end of the mouthpiece, wherein the widths of the center portion of the mouthpiece and of the first end and/or second end of the mouthpiece are measured along the extension of the second plane.

15. The horse bit according to claim 1, wherein the shank of the first cheek is attached to the first end, and/or the shank of the second cheek is attached to the second end, in a rigid manner to rigidly maintain the angle (α) of between 100° and 170°.

16. The horse bit according to claim 1, wherein the shank of each cheek extends along a longitudinal shank axis, with the majorities of each of the upper and lower arms of each shank extending along the longitudinal shank axis, and each lower arm end includes (i) a bore extending along a bore axis, the bore axis being spaced from the longitudinal shank axis and parallel to the longitudinal shank axis and (ii) a ring, wherein a portion of the ring is slidably received in the bore, and an axis of the ring is perpendicular to the longitudinal shank axis.

17. A horse bit assembly for inserting into a horse's mouth, comprising a first horse bit and a second horse bit wherein the first horse bit is a horse bit according to claim 1, wherein the second horse bit comprises a second mouthpiece having a center portion extending in a plane of extension of the second mouthpiece, and wherein the assembly is configured to be inserted into the horse's mouth such that the plane of extension of the center portion of the first horse bit's mouthpiece and the plane of extension of the center portion of the second mouthpiece extend substantially parallel to each other or such that the planes of extension intersect at an angle of between 0° and 30°.

18. The horse bit assembly according to claim 17, wherein the assembly is configured to be inserted into the horse's mouth such that the center portion of the first horse bit's mouthpiece does not overlap with the center portion of the second horse bit's mouthpiece.

19. The horse bit assembly according to claim 17, wherein the assembly is configured to be inserted into the horse's mouth such that the plane of extension of the center portion of the first horse bit's mouthpiece and the plane of extension of the center portion of the second horse bit's mouthpiece extend such that the planes of extension intersect at an angle of between 0° and 10°.

20. A horse bit for a horse having a mouth including a mouth opening and ears, the mouth opening including a roof and a lower jaw, the horse bit comprising:

a mouthpiece configured to be inserted into the mouth of the horse and comprising a first cheek and a second cheek;

wherein the mouthpiece has an upper side toward the roof of the mouth opening of the horse and includes a first end and a second end and a center portion between the first end and the second end, wherein the first end and the second end extend along a longitudinal mouthpiece axis, and wherein the center portion comprises at least one curved portion and is the center portion of the mouthpiece;

wherein each cheek includes a shank with an upper arm terminating at an upper arm end and a lower arm terminating at a lower arm end and a central portion between the upper arm and the lower arm, the lower arm nearer the mouth opening than the upper arm and the upper arm nearer the ears than the lower arm, each upper arm including a bridlework ring having a terminal portion spaced from the central portion of the corresponding shank;

wherein the central portion of the first cheek is rigidly attached to the first end of the mouthpiece to locate a length of the upper arm of the first cheek intermediate the bridlework ring of the first cheek and the first end of the mouthpiece attached to the first cheek, and the central portion of the second cheek is rigidly attached to the second end of the mouthpiece to locate a length of the upper arm of the second cheek intermediate the bridlework ring of the second cheek and the second end of the mouthpiece attached to the second cheek;

wherein each upper arm extends along a longitudinal axis and the axes of the upper arms define a first plane and wherein the mouthpiece is further configured such that the center portion of the mouthpiece extends in a second plane that is inclined at an angle ($\alpha$) of between 100° and 170° to the first plane, wherein the angle ($\alpha$) is measured forward from the upper arm along the upper side of the mouthpiece, and wherein the rigid attachment of the first and second cheeks to the mouthpiece rigidly maintains the angle ($\alpha$) of between 100° and 170°;

wherein for each shank a distance from the central portion to the lower arm end is greater than a distance from the central portion to the upper arm end; and wherein the terminal portion of the bridlework rings are spaced by a distance greater than the distance between the longitudinal axes of the upper arms.

* * * * *